United States Patent
Brindle

(10) Patent No.: US 8,224,888 B2
(45) Date of Patent: Jul. 17, 2012

(54) PUBLIC VARIABLE INTERFACE SYSTEM

(75) Inventor: Ralph C. Brindle, Edina, MN (US)

(73) Assignee: Honeywell International Inc., Morristown, NJ (US)

( * ) Notice: Subject to any disclaimer, the term of this patent is extended or adjusted under 35 U.S.C. 154(b) by 748 days.

(21) Appl. No.: 11/559,706

(22) Filed: Nov. 14, 2006

(65) Prior Publication Data
US 2008/0115153 A1 May 15, 2008

(51) Int. Cl.
*G06F 15/16* (2006.01)
*G01R 15/56* (2006.01)

(52) U.S. Cl. ......... 709/203; 709/201; 709/219; 705/412

(58) Field of Classification Search .......... 709/220–222, 709/201–203
See application file for complete search history.

(56) References Cited

U.S. PATENT DOCUMENTS

| | | | |
|---|---|---|---|
| 4,315,310 A * | 2/1982 | Bayliss et al. | ............ 710/3 |
| 4,654,653 A | 3/1987 | Brindle et al. | |
| 5,778,368 A | 7/1998 | Hogan et al. | |
| 6,008,805 A | 12/1999 | Land et al. | |
| 6,134,583 A * | 10/2000 | Herriot | ......... 709/217 |
| 6,615,404 B1 | 9/2003 | Garfunkel et al. | |
| 7,120,908 B1 | 10/2006 | Klimchynski | |
| 7,124,163 B2 | 10/2006 | Geofroy et al. | |
| 7,206,833 B1 * | 4/2007 | Sarangam et al. | ............ 709/224 |
| 7,373,632 B1 * | 5/2008 | Kawaguchi et al. | .......... 717/100 |
| 2002/0087883 A1 * | 7/2002 | Wohlgemuth et al. | ........ 713/201 |
| 2002/0120591 A1 * | 8/2002 | Keller | ............ 705/500 |
| 2005/0204020 A1 * | 9/2005 | O'Brien et al. | ............... 709/219 |
| 2006/0195834 A1 * | 8/2006 | Nichols et al. | ................ 717/168 |
| 2008/0057872 A1 * | 3/2008 | McFarland et al. | .......... 455/66.1 |

FOREIGN PATENT DOCUMENTS
JP 2001117810 A * 4/2001

OTHER PUBLICATIONS

Mohammad S. Raunak, Prashant Shenoy; Mohammad S. Raunak, Prashant Shenoy, Implications of Proxy Caching for Provisioning Networks and Servers; 2000; ACM; 1-58113; 67-77.*

* cited by examiner

*Primary Examiner* — Ashok Patel
*Assistant Examiner* — Evans Desrosiers
(74) *Attorney, Agent, or Firm* — Seager Tufte & Wickhem LLC

(57) ABSTRACT

A system for interfacing information between subsystems of an embedded software system with subsystem independence. It is a public variable system that defines a simple, extensible framework for interfacing between product subsystems such as control engines, input/output subsystems, and communications protocols. Server subsystems within the embedded software system are given the ability to make public information available for use by client subsystems within the system, with isolation between client and server subsystems.

18 Claims, 2 Drawing Sheets

PUBLIC VARIABLE INTERFACE SYSTEM

BACKGROUND

The invention pertains to an embedded software system and particularly to interfacing between subsystems of the system. Also, the invention pertains to communication protocols.

SUMMARY

The invention is a public variable system for attaining embedded software subsystem independence.

DESCRIPTION

Figure 1:
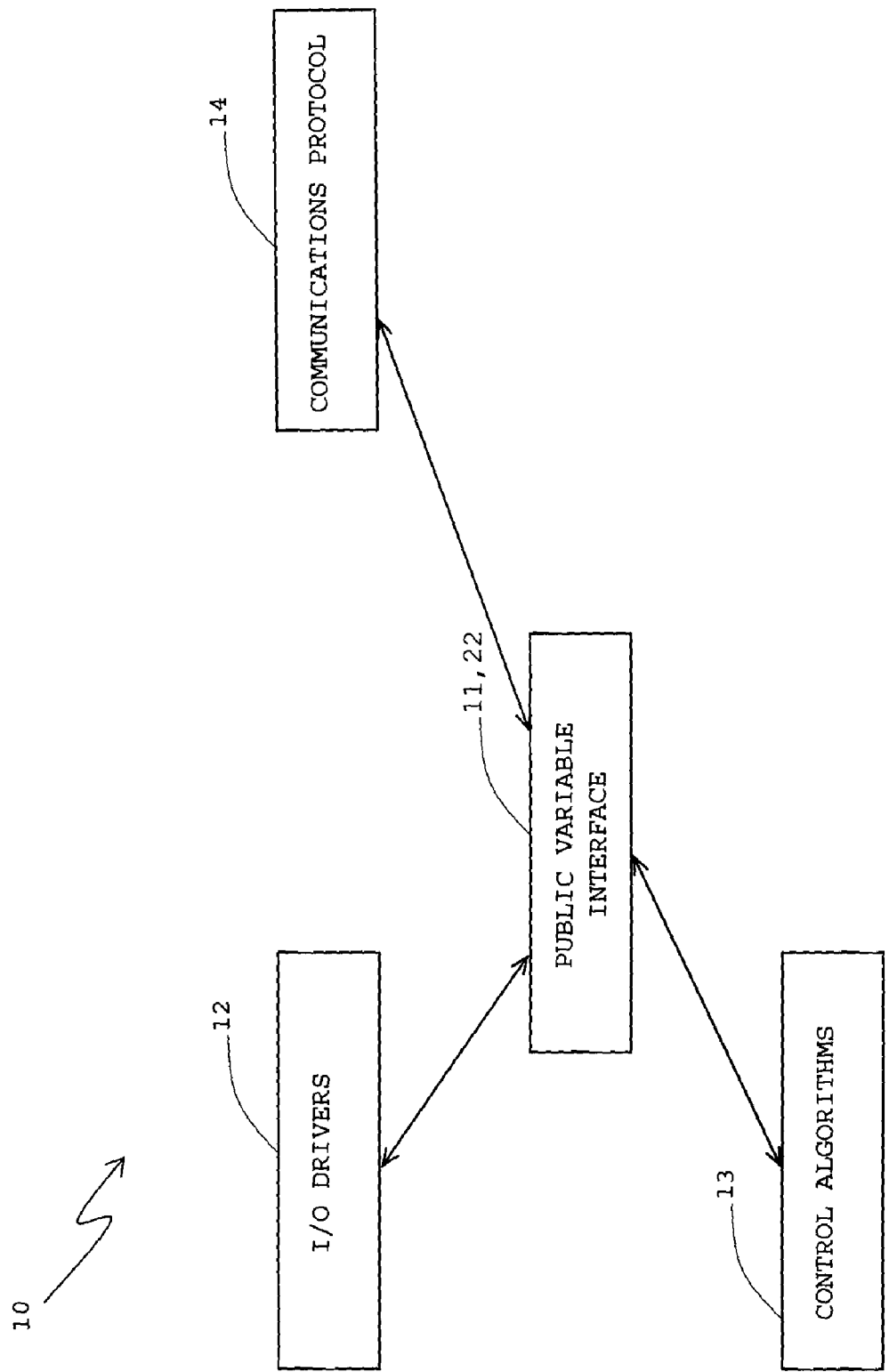
FIG. 1 is an overall diagram showing software subsystems of a system to which the public variable interface module relates.

A challenge is that embedded software for commercial building controllers should be designed so that multiple replaceable software subsystems, such as control engines and communication protocols can be supported, or that multiple products supporting distinct communication protocols can be developed quickly without impacting the other aspects of the product.

In response, the public variable system may define a simple, extensible framework for interfacing between product subsystems such as control engines, input/output subsystems, and so forth. These may involve communications protocols. Each subsystem within the product may be given a subsystem ID and the ability to define subranges of variables for its own use. The hierarchical definition of subranges by each subsystem may promote cohesion within subsystems and reduce coupling between subsystems. A subsystem can define a number of subranges related to a logical function, each with a number of variables, up to some maximum limits. A given variable may be represented by a PublicVariableID, which is a concatenation of the subsystem ID, subrange ID, and index of the variable within the subrange. In this way, each public variable may have a unique identifier which has been defined largely by the subsystem, in isolation from the other subsystems. Client subsystems having communication protocols may interface with the rest of the product by calling generic read and write functions with a public variable interface. The generic functions may locate the appropriate server subsystem and pass the call to a subsystem-specific service function.

An illustrative example of the present system may have a C language implementation. The generic client read and write interface functions can be of the form:

| PUBLIC VARIABLE CLIENT INTERFACE FUNCTION | DESCRIPTION |
| --- | --- |
| void VarRead(PublicVariableID svar, void * dptr, InternalDataType dtype); | Read the source variable into a destination buffer supplied by the caller, converting to the desired destination type as necessary. |
| void VarWrite(PublicVariableID var, void * sptr, InternalDataType stype); | Write the destination variable from source data of the specified source type, converting as necessary. |

The implementation of a given client subsystem involving a communication protocol may use the generic VarRead and VarWrite functions to access internal product data. All it needs to know are the public variable IDs for the information of interest to it. A communication protocol implementation, control engine, or input/output subsystem may be added or replaced without affecting the remainder of the product, beyond the public variable definitions.

The implementation of a given server subsystem may use interface functions (for an example or hypothetical subsystem XXX) of the following form:

| SERVER SUBSYSTEM PUBLIC DATA INTERFACE FUNCTION | DESCRIPTION |
| --- | --- |
| InternalDataType XXXGetType(const PublicVariableID var); | Returns the data type of the specified variable. |
| void XXXRead(const PublicVariableID var, void* pData); | Returns the current value of a public variable defined by the subsystem, in a buffer supplied by the caller. The data is returned in the type of the variable. No conversion is performed. |
| void XXXWrite(const PublicVariableID var, const void * sptr); | Write a variable defined by the subsystem. A pointer to the new data is provided. The data is expected to be in the destination variable format. No conversion is performed. |

The server subsystem provides and receives data in the most convenient format to the server, without concern for the format expected by the clients. The server subsystem determines the data format for each public variable it serves. The GetType function informs a caller of the format in which data for a given public variable is provided or expected.

FIG. 1 shows an overall diagram of a system 10 with subsystems to which the present invention relates. The system 10 may, along with appropriate hardware, include embedded software in a processor. The processor may be a part of a product. The invention may relate to software architecture designed for a flexible heating ventilation air conditioning (HVAC) control platform. The architecture may support multiple control applications on the same platform, either reusing core components in several code images, or by packaging multiple applications in the same code image, for selection in the field. Or the resultant product may be a mixture of these approaches, offering several code images, each with multiple applications as code size permits.

System 10 may have a public variable module 11 connected to an I/O drivers module 12 and a control algorithms module 13. Also, a communications storage module 14 may be connected to the public variable module 11. The modules noted herein may also be regarded as subsystems.

Figure 2:
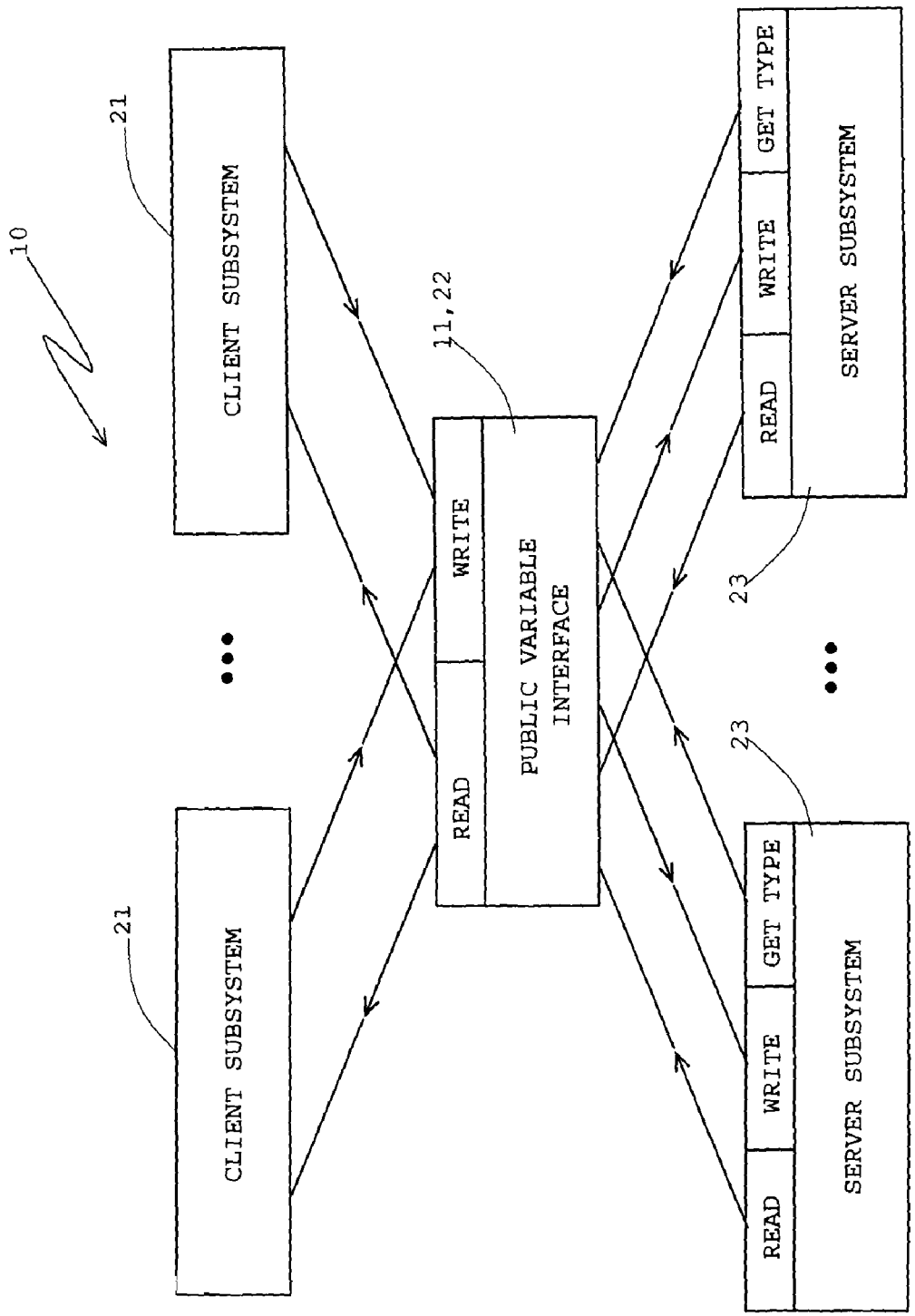
FIG. 2 is a diagram showing the relationship provided by the public variable module among client and server subsystems.

FIG. 2 is a diagram showing an interrelationship of client subsystems 21, a public variable interface module 22, and server subsystems 23. There may be virtually any number of client subsystems 21 and server subsystems 23 interacting with the public variable interface module 22. A client subsystem 21 may request the value of a public variable by calling the generic read function of the client interface. The public variable module 22 will respond by forwarding the read request to some server subsystem 23. The public variable module 22 will call the get type function of the same server subsystem, to determine the format of the data being returned. If the format of the data from the server subsystem differs with the format requested by the client, the public variable module 22 will perform a data conversion before returning the data to the requesting client subsystem 21. The client subsystem 21 would not know which server serviced the read request.

A requesting client subsystem 21 may request a write of a public variable by calling the generic write function of the client interface. The public variable module 22 calls the get type function of a particular server subsystem 23, and if the native format of the public variable differs from the format provided by the client 21, then module 22 performs a data conversion. The public variable module 22 forwards the write on to the same server subsystem 23, now providing data in the format expected by the server. The selected or particular server subsystem 23 may do the write or it may not do so at its discretion. It is not required to service the write request if it does not make sense to write the variable. The client subsystem 21 requesting the write will not know to which server subsystem 23 the write request went. This knowledge of the source is hidden from the client subsystem 21 by the public variable interface module 22.

A goal is to provide isolated access for client subsystems 21 via read and write functions. To accommodate these functions, a public variable ID is passed. The public variable ID is independent of actual memory storage locations, so it does not change when the product code is recompiled. This makes it usable by tools outside the product for specifying configurable mappings between subsystems.

The system may have multiple clients and multiple servers. Some subsystems might be both a client and server—a server of its own information and a client of information from other subsystems. The control algorithm may be an example of a subsystem that acts as a server for publicizing setpoints, while it acts as a client for getting analog input data from the I/O subsystem.

Traditionally, sharing of information between modules of an embedded software program has been accomplished via global variables. This approach exposes the implementation of the server subsystem to the client. If the server subsystem changes the name or type of the variable, the client subsystem must be recoded. A better approach is for the client to use a function call provided by the server to access the data in the server. The server can change the name or type of the variable without affecting the code in the client. The automatic data conversion aspect of the public variable interface system 22 further increases the isolation between the client subsystem 21 and server subsystem 23. It may permit, for example, a change in the native data type of a public variable, without affecting the code in the client subsystems that use that variable. The client specifies the desired data format, and the public variable system guarantees that data format on the client interface. The public variable system takes the isolation further, by using a public variable ID and generic function calls to access the shared information. The public variable ID permits subsystems to be configured by external tools to access public variables not directly referenced in the code. For example, a communication protocol may be configured to read and write setpoint data that is defined in the field—not at compile time.

There may be on-going development on the same platform, including other subsystems and different hardware. To the extent that subsystems can be designed to be configurable, rather than have their functionality defined at compile time, the public variable interface may make the on-going development on the same platform more efficient and quicker to market.

Independence of the client subsystem 21 may be increased by isolation from a server subsystem 23 by the public variable interface subsystem or module 22; however, one may want the implementation of the public variable interface subsystem to be also independent from the server subsystems to the best possible extent.

The public variable ID may be broken into portions so that the interface subsystem 22 can determine the appropriate server subsystem 23 to which a given request should be forwarded, without examining the entire public variable ID. The remaining portion of the public variable ID is left to be defined by the server subsystem at the latter's discretion. If the server makes changes to its portion of the public variable ID, the implementation of the interface module 22 does not have to reflect those changes. This aspect may increase the independence of the public variable interface subsystem 22 relative to the server subsystem 23. This does not necessarily affect the isolation of the client subsystem 21 from the server subsystem 23 since the isolation is put in place by the invention in the present embedded system.

To make the system functional, server subsystems 23 should strive to serve all read and write requests for the public variables they serve. But there may be variables, such as those representing physical inputs, for which a write operation does not make sense. In such cases, a server subsystem may choose not to serve the request. The server subsystem may always read, that is return something, but will write as its own option. From the client's interface, there are no prohibited operations. Read and write operations can be performed by any client 21 on any public variable.

If clients 21 wish to restrict access to public variables, they can choose to inhibit calls to the client public variable interface 22. For instance, a client such as a communications protocol that interfaces with the world outside the product may wish to make certain variables available to be read but not written via that protocol. It can do so by recognizing attempts to write the forbidden variables, and blocking the attempt. The client public variable interface is unaffected—it is simply not called by the client in that case.

The programmable controller here does not necessarily have a specific application but can be programmed in the field. Its nature is that a contractor or a firm in the field can incorporate their own control algorithms and program the controller for a specific application. The controller may be connected to an actuator for use with a damper or the controller may be without an actuator such as in a roof-top air handler, as examples. Application of the controller is very flexible. It provides leverage for making specific function devices or multiple size application products off of the same platform. The public variable interface 22 may provide for these capabilities.

As noted herein, the present system 10 may be for interfacing information between subsystems of an embedded software system. There may typically be two client interface functions which include to read and to write a public variable. The client 21 specifies the format of the data to be returned (with a read) or provided (with a write) as a data type. The type may be single byte, double byte, floating point, signed, unsigned, and may include engineering units, scaling, and the like. Each participating server subsystem 23 may have its own version of the three functions read, write and get type, where the get type function returns the native type of the public variable, which may differ from the type specified by the client. This is where the hiding of the server 23 from the client 21 is facilitated. When the client makes a request, it sees only the two client interface functions. Under the hood of the public variable interface module 22, a server subsystem 23 is called without the client subsystem's knowledge.

One or more server subsystems may provide a set of three server functions, distinct from the server functions of any other server.

The public variable subsystem 11, 22 may provide universal access to public variables. Unlike normal global variables, these variables are represented by enumerations that do not change with the memory layout. This allows variable interconnections (mappings) to be specified externally without dependence on the physical memory layout of the device.

Each subsystem can define variables and make them public by including them in the enumeration of public variable IDs, and providing support functions for accessing them. By providing a standard set of interface functions for accessing its public variables, each subsystem implements the desired data location hiding. It is even possible for a subsystem to simulate variables without actually declaring storage for them (such as variables that share an I/O port with other functions, for example).

The public variable interface module 11, 22 may be noted. The public variable subsystem provides universal read/write access to public variables via a public variable ID. The client subsystems may use these interface functions to access public variables.

The space of public variable IDs is divided into subsystems which support public variables. Each subsystem divides its space into subranges of like variables. Subranges are used to identify the subsystem to call when reading or writing the variable, or the type of the underlying variable, and in some cases, even the storage location (within an array of such variables). Using subranges also allows for expansion within a given subrange, without affecting the enumeration values of other subranges. Subranges aid the underlying server in locating the variable storage and making the data type known.

I/O drivers 12 may be noted. A set of I/O variables includes all information that is gathered from or sent to local hardware. Each I/O variable may be represented in the public variable enumeration.

The control algorithms module 13 may be noted. Control algorithms are defined in modular blocks that can be used in combination to effect the desired overall control strategy. Each control block defines its external inputs and outputs from the space of the public variables. The public variables are mapped to static storage, I/O, and communications variables that are actually available on the platform.

A communications protocol 14 may be noted. The set of communication variables may include all information that is visible outside the product—configuration data, control inputs and outputs, device status, and so on. The communications protocol does not define any public variables for use within the product. It acts only as a client of the public variable system, and not as a server. It defines communication variables for use outside the product in terms of references to public variables within the product.

In the present specification, some of the matter may be of a hypothetical or prophetic nature although stated in another manner or tense.

Although the invention has been described with respect to at least one illustrative example, many variations and modifications will become apparent to those skilled in the art upon reading the present specification. It is therefore the intention that the appended claims be interpreted as broadly as possible in view of the prior art to include all such variations and modifications.

What is claimed is:

1. A system for interfacing information between subsystems of an embedded software system of a heating, ventilation, and air conditioning (HVAC) control platform, comprising:
    a processor for controlling at least one component of an HVAC system;
    two or more server subsystems;
    a public variable module communicatively coupled to the processor and connected to the two or more server subsystems; and
    at least one client subsystem connected to the public variable module;
    wherein:
        the public variable module provides an interface between the two or more server subsystems and the at least one client subsystem;
        each of the two or more server subsystems defines subranges related to a logical function each with a number of variables;
        the variables are represented by a concatenation of a subsystem ID, a subrange ID, and an index such that each variable has a unique identifier; and
        the public variable module and subsystems are embedded in the HVAC control platform.

2. The system of claim 1, wherein the public variable module isolates the at least one client subsystem from the two or more server subsystem.

3. The system of claim 1, wherein the client subsystem has at least one interface function with the public variable module.

4. The system of claim 3, wherein the client subsystem receives virtually no information about the server subsystem that serves the public variable module in response to an interface function request from the client subsystem via the public variable module.

5. The system of claim 3, wherein the two or more server subsystems are not required to serve an interface function in response to an interface function request.

6. The system of claim 3, wherein an interface function may be selected from a group consisting of read and write interface functions.

7. The system of claim 6, wherein a read or write interface function comprises a specification of data type having at least one of a group consisting of a single byte, double byte, floating point, signed, unsigned, engineering unit, and scaling.

8. The system of claim 7, wherein a read or write interface function performs automatic data format conversion to obtain a format specified by the client subsystem.

9. A public variable system for embedded software for a building controller, comprising:
    a building controller configured to control at least one component of a heating, ventilation, and air conditioning (HVAC) system; a public variable module communicatively coupled to the controller; and a client subsystem connected to the public variable module; and wherein the public variable module is an interface for requests by the client subsystem to a server subsystem hidden from the client subsystem; wherein the server subsystem defines a number of public variables, the public variables configured such that the variable mappings are specified without dependence on a physical memory layout; wherein the variables are represented by a concatenation of a subsystem ID, a subrange ID, and an index such that each variable has a unique identifier; and wherein the public variable module is embedded in the building controller.

10. The system of claim 9, wherein the public variable module performs an automatic data conversion to a format specified by the client subsystem.

11. The system of claim 9, wherein the public variable module is recognized as a storage mechanism by the client subsystem.

12. The system of claim 9, wherein the requests comprise a read, write and/or get type of public variable.

13. The system of claim 12, wherein the functions have similar signatures, parameters and/or return values.

14. A method for interfacing subsystems of a system, comprising:
providing a processor configured to control a heating, ventilation, and air conditioning (HVAC) system; defining subranges within the processor related to a logical function each with a number of variables for each of the subsystems; receiving a read or write call from a client subsystem corresponding to one of the variables of one of the subranges of the subsystem, wherein the read or write call from the client subsystem has a specification of a format of data being provided with a write or returned with a read; providing the read or write call to a server subsystem; and providing a public variable interface to receive and provide the read or write call, wherein the public variable interface converts a format of data to the format of the specification of the read or write call from the client subsystem; wherein the variables are represented by a concatenation of a subsystem ID, a subrange ID, and an index such that each variable has a unique identifier; and wherein each of the number of variables is represented by a public variable ID having a unique identifier independent of an actual memory storage location.

15. The method of claim 14, wherein, for a read or write call, the public variable interface locates an appropriate server subsystem.

16. The method of claim 14, wherein the client subsystem, making a read or write call to the public variable interface for the server subsystem, does not receive information about the server subsystem.

17. The method of claim 16, wherein each subsystem provides a read or write call having a same form as read or write calls of other subsystems.

18. The method of claim 16, wherein:
the public variable interface has isolation from the server subsystem except for providing the read or write call to the server subsystem; and
the system is an embedded software system.

* * * * *